June 26, 1928.
J. R. OISHEI
WINDSHIELD CLEANER
Filed Jan. 18, 1926
1,674,657
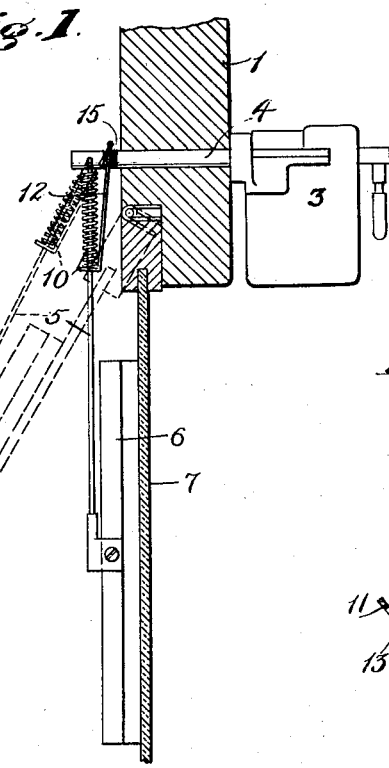
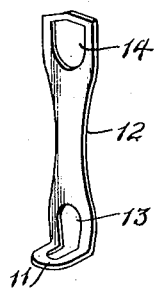
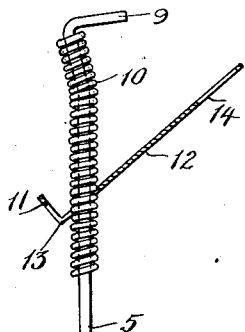
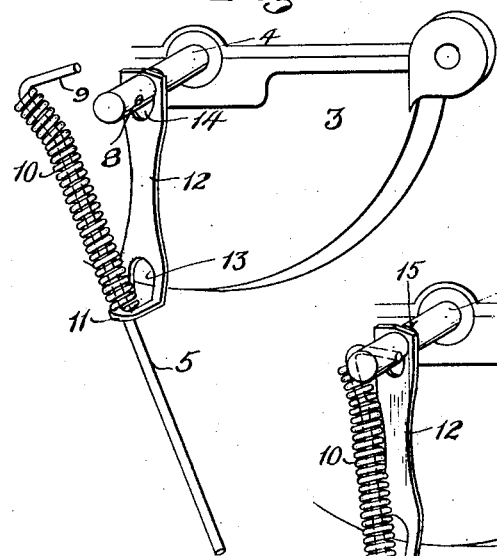
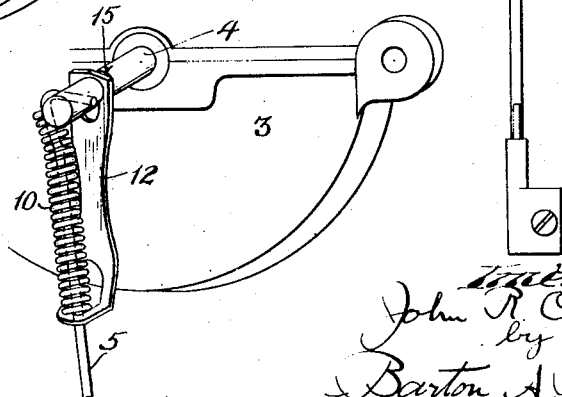

Patented June 26, 1928.

1,674,657

UNITED STATES PATENT OFFICE.

JOHN R. OISHEI, OF BUFFALO, NEW YORK.

WINDSHIELD CLEANER.

Application filed January 18, 1926. Serial No. 81,895.

This invention relates to windshield cleaners and more particularly to improvements in windshield cleaners whereby the installation of the windshield cleaner on a motor vehicle is facilitated and whereby the cleaner will be adapted for use on vehicles having windshield glasses which move or are opened in different directions.

For use with certain types of windshields of motor vehicles I have found it desirable to mount the windshield cleaner on the header or supporting bar to which the windshield glass is pivoted. To accommodate the opening and closing movement of the windshield, which as a rule swings outwardly from this header bar on a horizontal pivot or hinge, the wiper carrying arm of the windshield cleaner must also yield or swing outwardly and backwardly relative to its supporting shaft which projects through the header bar. Further, in such cases where the windshield cleaner is mounted on the header bar, or where the operating shaft of the windshield cleaner projects through the header bar, the operating shaft is relatively close to the top of the vehicle, and more particularly in cases where the vehicle is equipped with a visor there is a very small space available in which to work to attach the wiper carrying arm and wiper strip of the windshield cleaner. This makes desirable the provision of a wiper carrying arm which may be attached to the operating shaft of the windshield cleaner without the use of tools and in a few simple movements.

The objects of this invention are to provide a windshield cleaner which is easily and readily installed; to provide an improved spring arm for carrying the wiper element in yielding and resilient contact with the glass of the windshield and which will permit opening movement of the latter while still maintaining the resilient contact; and to provide adjustable means for varying the pressure of the wiper element on the windshield.

In the accompanying drawings:

Fig. 1 is a fragmentary sectional view through a windshield depicting a cleaner mounted thereon.

Fig. 2 is a detailed view of the end of the windshield cleaner shaft to which the wiper carrying arm is attached.

Fig. 3 is a detailed perspective view of the improved spring tensioning member.

Fig. 4 is a view depicting the method of mounting the spring tensioning member on the arm.

Fig. 5 shows the initial step of connecting the arm to the shaft.

Fig. 6 shows the assembly completed.

Referring more in detail to the accompanying drawing, the numeral 1 designates the header bar of the vehicle frame, to which the windshield frame 2 is hinged for opening forwardly or outwardly, as illustrated by dotted lines in Fig. 1.

The windshield cleaner, herein depicted, is of the fluid pressure motor type, the motor 3 being arranged on the rear side of the header bar with its wiper actuating shaft 4 extending through a bearing in said bar and projecting from the front side thereof for attachment to the wiper carrying arm 5, the latter carrying the wiper 6 for oscillatory stroking over the windshield glass 7.

The operating shaft is provided in its forward end with a transverse opening 8 which constitutes a pivotal bearing for the angular upper terminal 9 of the wiper arm 5. Encircling the upper end portion of the arm is a coiled spring 10 which bears at its upper end against the angular terminal or laterally directed pivot 9 and its lower end resting on the foot or ledge 11 of a spring tensioning member 12. This member is more in the nature of a stirrup and is preferably stamped from sheet metal stock. Each end portion is formed with an opening, the lower opening 13 being in the form of a key slot and having an enlarged entrance part in the shank of the stirrup and from which it tapers off into the angular foot 11 for receiving the arm 5 beneath the spring. The upper opening 14 is sufficiently large to readily receive the shaft 4, the latter having a series of seats or grooves 15 with which the upper end of the stirrup is selectively engaged. The grooves, in the present disclosure, extend circumferentially about the shaft and may be of any number for effecting the desired adjustment. The upper or shaft-attached end of the wiper arm is formed adjacent the pivot terminal 9 with an angular deflection which provides a bend or knee immediately adjacent said pivot 9. This construction is advantageous for several reasons, namely, it positions the lower end or major portion of the arm in substantially a plane extending radially from the operating shaft 4, and it provides a means for obtaining a firm frictional hold on the spring for preventing axial movement thereof along the rod-like arm 5. In this connection the coil spring 10 has preferably a fairly snug embracing relation with the wiper arm, but such an embrace as to permit of the spring being freely compressed and expanded as is required in the proper functioning of a spring or resilient element. When the coil spring is slid axially up over the bend or deflection in the rod 5, the spring is also caused to assume this angular deflection with the result that the portion of the spring surrounding said bend will frictionally grip the rod and secure the spring against unauthorized axial movement along the rod or arm to a practical extent.

In assembling the cleaner parts, the motor 3 is first secured to the header bar with its shaft projecting forwardly substantially as shown in the drawings. The spring tensioning member or stirrup is next mounted on the arm by threading the angular end 9 and the previously positioned spring 10 through the entrance part of opening 13, as indicated in Fig. 4, until the stirrup passes below the spring when the shank is then swung up against the spring to bring the foot 11 beneath the same in supporting contact therewith. In this position the arm is embraced by the tapering sides of the opening 13 where it extends into the foot. The upper end of the stirrup is next threaded over the shaft 4 and engaged in one of the grooves 15, as depicted in Fig. 5, following which the pivot 9 is inserted in its bearing 8 against the tension of the spring 10, which latter has to be compressed to insert said pivot. Consequently the pivotal relation between the operating shaft and the wiper carrying arm is maintained through the tensioned elements 10, 12.

As noted in Fig. 1, the stirrup is seated in the first groove 15 which is spaced from the pivotal mounting 8, 9 so as to exert an inward pull on the arm for firmly and resiliently pressing the wiper 6 against the glass. Should this pressure of the wiper on the glass be too light the stirrup is shifted to the next groove 15 which will increase the angular relation between the arm and stirrup so that the latter will exert a greater pull on the arm toward the glass. The adjustment of the stirrup to the next groove also further compresses the spring. When the windshield is opened, as to the dotted line position of Fig. 1, the pivotal connection 8, 9, permits the arm 5 to swing with it, while the stirrup and spring afford the desired resilient or yieldable pressure of the wiper on the glass. During the outward swinging of the windshield, the spring is further compressed but the stirrup swings closer to the arm to avoid excessive pressure between the wiper and the glass. As the arm swings on its pivot the stirrup also swings on its selected pivot point 15, the spring compressing as the arm and stirrup approach a common plane longitudinal of the arm.

I claim as my invention:

1. In a windshield cleaner, an operating shaft having a transverse bearing and a series of grooves spaced therefrom, a wiper carrying arm having at one end a transversely disposed part pivotally supported in the bearing of the shaft, a spring coiled about the arm, and a retaining member slidably engaged with the arm for holding the spring tensioned and having a part selectively engageable with the grooves for adjusting the tension on the spring.

2. In a windshield cleaner, an operating shaft, a wiper carrying arm pivoted thereto for swinging lengthwise thereof, and a tensioning device comprising a spring carried by one of the aforesaid elements and an adjustable pressure exerting member connecting the shaft and arm at points spaced from the pivotal connection and acted upon by said spring, and in cooperation therewith for urging the arm in a predetermined direction about its pivotal axis.

3. In a windshield cleaner, a rockable operating shaft, a wiper carrying arm pivoted thereto for swinging perpendicularly to the windshield glass, and a pressure exerting device between the shaft and arm and comprising a spring coiled about one of said first-named elements, and a stirrup engaged at one end with the other of said first-named elements at a point spaced from the pivotal connection of the wiper carrying arm and at its opposite end with the end of the spring remote from the pivotal connection for compressing it toward the pivotal connection on pivotal movement of the arm.

4. In a windshield cleaner, an operating shaft, a wiper carrying arm pivoted thereto for swinging perpendicularly to the windshield glass, a spring on the arm compressible toward the pivotal connection, and a stirrup having one end adjustably and pivotally engaging the shaft at a point spaced from the pivotal connection of the arm and its opposite end slidably engaging the arm beneath the spring to compressibly support the latter.

5. In a windshield cleaner, an operating shaft, means for rocking the shaft, a wiper carrying arm pivoted to the shaft for swinging lengthwise thereof, a spring on the arm adapted to be compressed toward the pivot mounting of the arm, and a stirrup pivotally hung over the shaft between said means and said arm for swinging with the arm and having a lateral foot engaging about the arm beneath the spring in supporting relation to the latter for holding the spring normally compressed and for further compressing the spring upon outward pivotal movement of the arm.

6. In a windshield cleaner, an operating shaft, a wiper carrying arm pivoted thereto for swinging perpendicularly to the windshield glass, a resilient member on the arm compressible toward the pivotal connection, and a sheet metal stirrup having an opening receiving the shaft for suspending the stirrup therefrom, the lower end of said stirrup being extended laterally and recessed to slidably engage the arm beneath the resilient member to tension the resilient member.

7. In a windshield cleaner, an operating shaft, a wiper carrying arm pivoted thereto for swinging lengthwise thereof, and a device for exerting pressure on the arm toward the windshield to which the cleaner is applied, comprising a resilient member on the arm, and a stirrup having an opening at one end to receive the shaft and an opening in its opposite end formed with an enlarged entrance part for being initially passed over the arm and then moved into the narrow part of said second opening to embrace the arm beneath said resilient member for supporting the latter under compression.

8. In a windshield cleaner, an operating shaft having a transverse groove therein, a wiper carying arm pivoted thereto for swinging lengthwise thereof, a stirrup engaged in the groove and suspended from the shaft with its lower end extended laterally about the arm, and resilient means seated on the lower end of the stirrup and compressed between said lower end and the pivotal connection to cooperate with the stirrup in yieldably pressing the wiper carrying arm toward the windshield on which the cleaner is mounted.

9. In a windshield cleaner, an operating shaft, a wiper carrying arm pivoted thereto for swinging lengthwise thereof, a spring compressible on the arm toward the pivotal connection, and a tensioning member including a stirrup having a laterally directed foot at one end, the opposite end of the stirrup being adapted for connection to the shaft, said stirrup having a key slot therein with the reduced portion of the slot extending into the foot thereof, the entrance opening of the slot in the stirrup being of a diameter to receive the spring, and the width of the reduced slot in the foot being less than that of the spring but greater than the thickness of the adjacent arm portion whereby the stirrup may be passed over the spring and the arm then moved into the reduced slot of the foot beneath the spring for supporting the latter under compression.

10. In a windshield cleaner, a rotatably operating shaft having a transverse opening therein extending substantially horizontal when the rotatably operating shaft is substantially midway between its limits of movement, a wiper carrying arm normally extending in a substantially perpendicular plane when the operating shaft is substantially midway between its limits of movement, and having one end portion bent at an angle to provide a pivot engaging in the shaft opening whereby the wiper arm may swing in the longitudinal plane of the shaft, a coiled spring surrounding the wiper arm and frictionally held against bodily longitudinal movement on the arm, one end of the spring bearing on the pivot-forming terminal of the arm, and means engaging the opposite end of the spring for compressing said spring toward said pivot forming end of the arm, said means having support on the operating shaft.

JOHN R. OISHEI.